United States Patent
Cronin et al.

(10) Patent No.: US 11,062,375 B1
(45) Date of Patent: *Jul. 13, 2021

(54) AUTOMATIC SHOPPING BASED ON HISTORICAL DATA

(71) Applicant: Blazer and Flip Flops, Inc., San Diego, CA (US)

(72) Inventors: John Cronin, Bonita Springs, FL (US); Cheryl Milone, Holmdel, NJ (US)

(73) Assignee: BLAZER AND FLIP FLOPS, INC., San Diego, CA (US)

( * ) Notice: Subject to any disclaimer, the term of this patent is extended or adjusted under 35 U.S.C. 154(b) by 398 days.

This patent is subject to a terminal disclaimer.

(21) Appl. No.: 14/970,144

(22) Filed: Dec. 15, 2015

Related U.S. Application Data

(60) Provisional application No. 62/093,284, filed on Dec. 17, 2014.

(51) Int. Cl.
| | |
|---|---|
| *G06Q 30/06* | (2012.01) |
| *G06Q 20/20* | (2012.01) |
| *G06Q 20/32* | (2012.01) |
| *H04B 5/00* | (2006.01) |
| *H04W 4/80* | (2018.01) |
| *G06F 3/0482* | (2013.01) |

(52) U.S. Cl.
CPC ....... *G06Q 30/0631* (2013.01); *G06Q 20/204* (2013.01); *G06Q 20/3278* (2013.01); *H04B 5/0031* (2013.01); *H04W 4/80* (2018.02); *G06F 3/0482* (2013.01)

(58) Field of Classification Search
CPC .......... G06Q 30/0631; G06Q 20/3278; G06Q 20/204
See application file for complete search history.

(56) References Cited

U.S. PATENT DOCUMENTS

| | | | |
|---|---|---|---|
| 5,473,143 A | 12/1995 | Vak et al. | |
| 6,874,126 B1 * | 3/2005 | Lapidous | G06F 3/0481 715/711 |
| 6,973,172 B1 | 12/2005 | Bitove et al. | |
| 7,386,485 B1 * | 6/2008 | Mussman | G06Q 30/02 705/14.1 |
| 7,828,204 B2 | 11/2010 | Fiebiger et al. | |

(Continued)

FOREIGN PATENT DOCUMENTS

| | | |
|---|---|---|
| CN | 103679475 | 3/2014 |
| EP | 2 533 186 | 12/2012 |

(Continued)

OTHER PUBLICATIONS

Alliance, Smart Card. "The mobile payments and NFC landscape: A US perspective." Smart Card Alliance (2011): 1-53. (Year: 2011).*

(Continued)

*Primary Examiner* — Asfand M Sheikh
(74) *Attorney, Agent, or Firm* — Polsinelli LLP

(57) ABSTRACT

The present invention include systems and methods directed towards optimizing in-store purchases at a point of sale using near field communications (NFC) for a purchase transaction performed by a user on their NFC compatible device. In particular, the purchaser is allowed to request data for making additional purchases and completing those additional purchases at the same time as the original NFC purchase transaction.

21 Claims, 11 Drawing Sheets

(56) References Cited

U.S. PATENT DOCUMENTS

| | | |
|---|---|---|
| 7,832,646 B1 | 11/2010 | Leason |
| 7,844,512 B2 | 11/2010 | Richards et al. |
| 8,065,190 B2 | 11/2011 | Collas et al. |
| 8,105,772 B2 | 4/2012 | Mardikar et al. |
| 8,306,860 B2 | 11/2012 | Dunsmore et al. |
| 8,474,701 B1 | 7/2013 | Meek et al. |
| 8,494,913 B2 | 7/2013 | Cavagnaro |
| 8,498,900 B1 | 7/2013 | Spirin et al. |
| 8,577,803 B2 | 11/2013 | Chatterjee et al. |
| 8,690,054 B1 | 4/2014 | Cummins et al. |
| 8,714,439 B2 | 5/2014 | Brendell et al. |
| 8,718,554 B2 | 5/2014 | Abel |
| 8,762,211 B2 | 6/2014 | Killian et al. |
| 8,783,561 B2 | 7/2014 | Wesley |
| 8,788,324 B1 | 7/2014 | Shetty et al. |
| 8,799,085 B2 | 8/2014 | Fisher |
| 8,805,726 B2 | 8/2014 | Fisher |
| 8,811,895 B2 | 8/2014 | Reisgies et al. |
| 8,954,004 B1 | 2/2015 | Wang et al. |
| 9,582,826 B2 | 2/2017 | Calman et al. |
| 9,646,303 B2 * | 5/2017 | Karpenko .......... G06Q 20/3829 |
| 9,672,511 B2 | 6/2017 | Lim |
| 9,734,091 B2 | 8/2017 | Kadi et al. |
| 9,985,699 B1 | 5/2018 | Cronin |
| 9,990,621 B1 | 6/2018 | Ng et al. |
| 10,204,335 B1 | 2/2019 | Donavalli et al. |
| 10,262,311 B1 | 4/2019 | Cronin |
| 10,262,318 B1 | 4/2019 | Cronin |
| 10,348,368 B2 | 7/2019 | Cronin |
| 10,516,964 B2 | 12/2019 | Dotan et al. |
| 10,580,011 B1 | 3/2020 | Cronin |
| 10,679,207 B1 | 6/2020 | Huffines |
| 2002/0026348 A1 | 2/2002 | Fowler et al. |
| 2002/0062249 A1 | 5/2002 | Iannacci |
| 2004/0010597 A1 | 1/2004 | Kirschner et al. |
| 2004/0220876 A1 | 11/2004 | Liu |
| 2005/0004839 A1 | 1/2005 | Bakker et al. |
| 2005/0210240 A1 | 9/2005 | Barron |
| 2006/0131390 A1 | 6/2006 | Kim |
| 2006/0206378 A1 | 9/2006 | Ficalora |
| 2007/0022375 A1 | 1/2007 | Walker |
| 2007/0032225 A1 | 2/2007 | Konicek et al. |
| 2007/0190939 A1 | 8/2007 | Abel |
| 2007/0192198 A1 * | 8/2007 | Schwarz ................ G06Q 30/02 705/26.1 |
| 2007/0203850 A1 | 8/2007 | Singh et al. |
| 2008/0011837 A1 | 1/2008 | Wesley |
| 2008/0078831 A1 | 4/2008 | Johnson et al. |
| 2008/0109335 A1 | 5/2008 | Keohane et al. |
| 2008/0120155 A1 | 5/2008 | Pliha |
| 2008/0133351 A1 | 6/2008 | White et al. |
| 2008/0147496 A1 | 6/2008 | Bal et al. |
| 2008/0150678 A1 | 6/2008 | Giobbi et al. |
| 2008/0167017 A1 | 7/2008 | Wentker et al. |
| 2008/0167961 A1 | 7/2008 | Wentker et al. |
| 2009/0082001 A1 | 3/2009 | Rahul et al. |
| 2009/0132362 A1 | 5/2009 | Fisher et al. |
| 2009/0138365 A1 * | 5/2009 | Mueller ................ G06Q 20/12 705/14.19 |
| 2009/0156190 A1 | 6/2009 | Fisher |
| 2009/0192935 A1 | 7/2009 | Griffin et al. |
| 2009/0276305 A1 | 11/2009 | Clopp |
| 2010/0010887 A1 | 1/2010 | Karlin et al. |
| 2010/0082455 A1 * | 4/2010 | Rosenblatt ......... G06Q 30/0251 705/26.1 |
| 2010/0088149 A1 | 4/2010 | Sullivan et al. |
| 2010/0114677 A1 | 5/2010 | Carlson et al. |
| 2010/0124914 A1 | 5/2010 | Schmidt et al. |
| 2010/0125510 A1 | 5/2010 | Smith et al. |
| 2010/0190437 A1 | 7/2010 | Buhot |
| 2010/0211507 A1 | 8/2010 | Aabye et al. |
| 2010/0211679 A1 | 8/2010 | Kumar et al. |
| 2010/0274691 A1 | 10/2010 | Hammad et al. |
| 2010/0274853 A1 | 10/2010 | Carlson et al. |
| 2010/0309807 A1 | 12/2010 | Rautiainen |
| 2010/0312692 A1 | 12/2010 | Teicher |
| 2011/0016050 A1 | 1/2011 | Evans |
| 2011/0153438 A1 | 6/2011 | Dragt |
| 2011/0167133 A1 | 7/2011 | Jain |
| 2011/0202402 A1 | 8/2011 | Fowler et al. |
| 2011/0218849 A1 | 9/2011 | Rutigliano et al. |
| 2011/0230209 A1 | 9/2011 | Kilian |
| 2011/0238517 A1 | 9/2011 | Ramalingam et al. |
| 2011/0258249 A1 | 10/2011 | Biggs et al. |
| 2011/0276511 A1 | 11/2011 | Rosenberg |
| 2011/0313922 A1 | 12/2011 | Ben Ayed |
| 2011/0320345 A1 | 12/2011 | Taveau et al. |
| 2012/0036076 A1 | 2/2012 | Vanderwall et al. |
| 2012/0078701 A1 | 3/2012 | Woods |
| 2012/0078735 A1 | 3/2012 | Bauer et al. |
| 2012/0089461 A1 | 4/2012 | Greenspan |
| 2012/0101882 A1 | 4/2012 | Todd |
| 2012/0109730 A1 | 5/2012 | Yoder et al. |
| 2012/0136732 A1 | 5/2012 | McMillen et al. |
| 2012/0148077 A1 | 6/2012 | Aldaz et al. |
| 2012/0160912 A1 | 6/2012 | Laracey |
| 2012/0166332 A1 | 6/2012 | Naaman |
| 2012/0185315 A1 | 7/2012 | Vanderheide et al. |
| 2012/0209749 A1 | 8/2012 | Hammad et al. |
| 2012/0221401 A1 | 8/2012 | Brown et al. |
| 2012/0253913 A1 | 10/2012 | Richard |
| 2012/0330744 A1 | 12/2012 | Aissa |
| 2013/0006773 A1 | 1/2013 | Lutnick et al. |
| 2013/0006782 A1 | 1/2013 | Schwarzkopf et al. |
| 2013/0020389 A1 | 1/2013 | Barnett |
| 2013/0059534 A1 | 3/2013 | Sobalvarro et al. |
| 2013/0067546 A1 | 3/2013 | Thavasi et al. |
| 2013/0080241 A1 | 3/2013 | Fisher |
| 2013/0080972 A1 | 3/2013 | Moshrefi et al. |
| 2013/0085835 A1 | 4/2013 | Horowitz |
| 2013/0095755 A1 | 4/2013 | Moreton et al. |
| 2013/0097040 A1 | 4/2013 | Fisher |
| 2013/0110261 A1 | 5/2013 | Lee et al. |
| 2013/0110682 A1 | 5/2013 | Rosenblatt et al. |
| 2013/0132282 A1 | 5/2013 | Shakkarwar |
| 2013/0144715 A1 | 6/2013 | Kranzley et al. |
| 2013/0191213 A1 | 7/2013 | Beck et al. |
| 2013/0191246 A1 | 7/2013 | Calman et al. |
| 2013/0204728 A1 | 8/2013 | Lichterman et al. |
| 2013/0211987 A1 | 8/2013 | Louie et al. |
| 2013/0215467 A1 | 8/2013 | Fein et al. |
| 2013/0218682 A1 | 8/2013 | Alterman et al. |
| 2013/0256403 A1 | 10/2013 | MacKinnon |
| 2013/0268378 A1 | 10/2013 | Yovin |
| 2014/0006205 A1 | 1/2014 | Berry et al. |
| 2014/0006272 A1 | 1/2014 | Calman et al. |
| 2014/0058955 A1 | 2/2014 | Calman |
| 2014/0074637 A1 | 3/2014 | Hammad |
| 2014/0074691 A1 | 3/2014 | Bank et al. |
| 2014/0081855 A1 | 3/2014 | Hankins et al. |
| 2014/0089178 A1 | 3/2014 | Lee et al. |
| 2014/0089196 A1 | 3/2014 | Paya et al. |
| 2014/0089672 A1 | 3/2014 | Luna et al. |
| 2014/0100983 A1 | 4/2014 | Cavagnaro |
| 2014/0129357 A1 | 5/2014 | Goodwin |
| 2014/0138435 A1 | 5/2014 | Khalid |
| 2014/0172660 A1 | 6/2014 | Louie et al. |
| 2014/0173063 A1 | 6/2014 | Jeong et al. |
| 2014/0180826 A1 | 6/2014 | Boal |
| 2014/0189836 A1 | 7/2014 | Eyler |
| 2014/0201085 A1 | 7/2014 | Brendell et al. |
| 2014/0207680 A1 * | 7/2014 | Rephlo ................ G06Q 20/322 705/44 |
| 2014/0214673 A1 | 7/2014 | Baca et al. |
| 2014/0222670 A1 | 8/2014 | Concannon |
| 2014/0274014 A1 | 9/2014 | Dodla |
| 2014/0277805 A1 | 9/2014 | Browne et al. |
| 2014/0279474 A1 | 9/2014 | Evans et al. |
| 2014/0298027 A1 | 10/2014 | Roberts et al. |
| 2014/0330654 A1 | 11/2014 | Turney et al. |
| 2014/0337151 A1 | 11/2014 | Crutchfield |
| 2014/0351057 A1 | 11/2014 | Kwon et al. |
| 2014/0351071 A1 | 11/2014 | Hong et al. |
| 2014/0351147 A1 | 11/2014 | Castrechini et al. |

(56) References Cited

U.S. PATENT DOCUMENTS

| | | | |
|---|---|---|---|
| 2015/0019439 A1 | 1/2015 | Phillips | |
| 2015/0073907 A1 | 3/2015 | Purves et al. | |
| 2015/0088626 A1 | 3/2015 | Salmon et al. | |
| 2015/0088631 A1 | 3/2015 | Mitchell | |
| 2015/0095224 A1 | 4/2015 | Blythe | |
| 2015/0100443 A1 | 4/2015 | Vann Heerden et al. | |
| 2015/0100803 A1 | 4/2015 | Chen et al. | |
| 2015/0120473 A1 | 4/2015 | Jung et al. | |
| 2015/0127549 A1 | 5/2015 | Khan | |
| 2015/0154634 A1 | 6/2015 | Chiu et al. | |
| 2015/0156311 A1 | 6/2015 | Adams et al. | |
| 2015/0186871 A1 | 7/2015 | Laracey | |
| 2015/0220915 A1 | 8/2015 | Rosenberg | |
| 2015/0302398 A1 | 10/2015 | Desai et al. | |
| 2015/0339318 A1 | 11/2015 | O'Toole et al. | |
| 2015/0356551 A1 | 12/2015 | Dogin et al. | |
| 2016/0055512 A1 | 2/2016 | Godsey et al. | |
| 2016/0057619 A1 | 2/2016 | Lopez | |
| 2016/0117667 A1 | 4/2016 | Kang et al. | |
| 2016/0125414 A1 | 5/2016 | Desai et al. | |
| 2016/0162882 A1 | 6/2016 | McClung | |
| 2016/0192123 A1 | 6/2016 | Lim | |
| 2016/0275499 A1 | 9/2016 | Gardiner et al. | |
| 2016/0321641 A1 | 11/2016 | Cady et al. | |
| 2017/0024733 A1 | 1/2017 | Purves | |
| 2017/0287321 A1 | 10/2017 | Ann et al. | |
| 2017/0295032 A1 | 10/2017 | Shin et al. | |
| 2018/0041591 A1 | 2/2018 | Yoden | |
| 2018/0050450 A1 | 2/2018 | Parrott et al. | |
| 2018/0248589 A1 | 8/2018 | Cronin | |
| 2018/0374073 A1 | 12/2018 | Zhao | |
| 2019/0050895 A1* | 2/2019 | Levy | G06Q 30/0643 |
| 2019/0172035 A1 | 6/2019 | Cronin | |
| 2019/0325426 A1 | 10/2019 | Cronin | |
| 2019/0326957 A1 | 10/2019 | Cronin | |
| 2020/0202362 A1 | 6/2020 | Cronin | |

FOREIGN PATENT DOCUMENTS

| | | |
|---|---|---|
| WO | WO 2012/051071 | 4/2012 |
| WO | WO 2013/096486 | 6/2013 |

OTHER PUBLICATIONS

U.S. Appl. No. 14/970,304, John Cronin, NFC Transaction Choices, filed Dec. 15, 2015.
U.S. Appl. No. 14/970,311, John Cronin, NFC Triggered Incentives at Point-of-Sale, filed Dec. 15, 2015.
U.S. Appl. No. 14/970,314, John Cronin, NFC Ubiquitous Modular Payment Terminal, filed Dec. 15, 2015.
U.S. Appl. No. 14/970,319, John Cronin, NFC ATM Vending Machine With Added Two Way Nonfinancial Data, filed Dec. 15, 2015.
U.S. Appl. No. 14/970,328, John Cronin, Payments Data Source Tagging for Accounts Statements, filed Dec. 15, 2015.
U.S. Appl. No. 14/970,056, John Cronin, NFC-Based Payment as a Service, filed Dec. 15, 2015.
U.S. Appl. No. 14/970,069, John Cronin, NFC Improving Content Transfer in Low Bandwidth NFC Payments Systems, filed Dec. 15, 2015.
U.S. Appl. No. 14/970,080, John Cronin, NFC Increased Biometrics Based on Transactions Parameters, filed Dec. 15, 2015.
U.S. Appl. No. 14/970,091, John Cronin, Interaction With Purchaser in NFC-Based Transaction, filed Dec. 15, 2015.
U.S. Appl. No. 14/970,102, John Cronin, NFC Center, filed Dec. 15, 2015.
U.S. Appl. No. 14/970,338, John Cronin, Payment Processes With Warranty Options, filed Dec. 15, 2015.
U.S. Appl. No. 14/970,340, John Cronin, Real Time Credit Offers, filed Dec. 15, 2015.
U.S. Appl. No. 14/970,125, John Cronin, NFC Transaction With Financial and Non-Financial Data, filed Dec. 15, 2015.
U.S. Appl. No. 14/970,139, John Cronin, Bill Splitting and Account Delegation NFC, filed Dec. 15, 2015.
U.S. Appl. No. 14/970,304 Office Action dated Jan. 12, 2018.
U.S. Appl. No. 14/970,314 Office Action dated Mar. 8, 2018.
U.S. Appl. No. 14/970,328 Office Action dated Feb. 14, 2018.
U.S. Appl. No. 14/970,069 Office Action dated Mar. 28, 2018.
U.S. Appl. No. 14/970,080 Office Action dated Feb. 26, 2018.
U.S. Appl. No. 14/970,102 Final Office Action dated Nov. 30, 2017.
Airplus—Mobile Payment—How It Will Transform Corporate Travel and Expense Management, Apr. 18, 2012.
Case Study—Bill Splitting App for Restaurantst, 2013.
AuthenTec—AuthenTec Fingerpring Technology Featured in Two New Fujitsu NFC-enabled Mobile Phones from NTT Docomo, Nov. 16, 2011.
Balaban, Dan; "Spanish Bank Installs 'First' Contactless ATMs", NFC Times, Apr. 5, 2011.
Blaze Mobile Wallet, Jan. 2008.
Boden, Rian; "PrivatBank cuts ATM costs with NFC", NFC World, Nov. 5, 2013.
Borison, Rebecca; "Google Wallet adds geolocated loyalty to iOS, combats Passbook", Mobile Commerce Daily, Feb. 7, 2014.
Carson, Biz; "BitPay brings one-touch payments to bitcoin with new NFC-compatible checkout app." Nov. 4, 2014.
Cluckey, Suzanne; "New guide offers a comprehensive view of ATM and mobile integration", Mobile Payments Today, Nov. 28, 2014.
CommBank Small Business app User Guide, CommonwealthBank. Jul. 11, 2014.
Dai, Weihui; "An Integrated Mobile Phone Payment System Based on 3G Network", Journal of Networks, vol. 6, No. 9, Sep. 2011.
Dragt, Bruce; "Universal Commerce: A Seamless, Personalized Purchase Experience for Today's Connected Consumers", A First Data White Paper, 2012.
Fraser, Jeff; "The Mobile Shopper: Lose Your Wallet." Jun. 1, 2014.
Girt Mobile—Mobile Application Development Ireland, Dec. 2, 2014.
Google Wallet Privacy Policy, Nov. 16, 2011.
Hoyos Labs, Nov. 28, 2014.
I-Free Unveils New and Improved "Wallet": NFC Mobile App Now Stores Contactless Transport Cards and Discount Coupons, i-Free News, Nov. 7, 2013.
FAQ and Support—CashCloud.com, Dec. 3, 2014.
Itautec Mobicash, Feb. 13, 2013. Link: https://youtu.be/-qaL2QHliok (youtube video, no pdf).
Khan, Vaseem; "Contactless card reader by Diebold leverages NFC technology at ATM's to give cash", NFC, Payments, Oct. 10, 2013.
Keane, Byran; "Key Takeaways From Money2020 Industry Conf", Deutsche Bank Markets Research. Oct. 10, 2013.
Lawler, Ryan; "Square's Order App Can Now Predict When You'll Arrive to Pick Up Your Cappuccino", TechCrunch, Oct. 8, 2014.
Ma et al., Xiaohua; "The Architecture of Mobile Wallet System Based on NFC (Near Field Communication)", Research Journal of Applied Sciences, Engineering and Technology 7(12): 2589-2595, 2014, ISSN: 2040-7459; e-ISSN: 2040-7467, Mar. 29, 2014.
Mastin, Michelle; "Square vs.. Intuit GoPayment: Mobile Credit Card Systems Compared", BIZFEED, PCWorld, Sep. 6, 2011.
Mobile_Commerce_NFC_Coupons_and_Loyalty_Acceptance—Technical Proposal, Version 1.0, Jul. 1, 2014.
More Magic: Mobile Banking & Payment Applications, Nov. 30, 2014.
NEC—Integrated E-Money Solution, Jan. 20, 2014.
"New breed of ATM Visits Times Square", Mobileinfo.com, Issue #2001, Jul. 30, 2001.
NFC & Contactless—Mobile and card solutions, NFC & Mobile Money Summit, Oct. 14-17, 2013.
NFC ReTag Free—WidgApp Mobile Solutions Tools, Google Play, Jul. 17, 2014.
NFC White Paper—Alcatel-Lucent Mobile Wallet Service, Dec. 2011.
NXP—NFC for embedded applications: Your Critical link for the Internet of Things, Aug. 21, 2014.
Patni, Chandra; "Pouch NFC PayPass & PayWave Card Issuance, pouch-let your mobile pay!", www.yes-wallet.com, Apr. 13, 2012.

(56) References Cited

OTHER PUBLICATIONS

"Pay2You Places: shopping by geolocation", Connexions, Jul. 5, 2013.
Pourghomi et al., Pardis; "Cloud-based NFC Mobile Payments", Journal of Internet Technology and Secured Transactions (JITST), vol. 2, Issues 1/2/3/4, Mar.-Dec. 2013.
Pourghomi et al., Pardis; "A Proposed NFC Payment Application", International Journal of Advanced Computer Science and Applications, vol. 4, No. 8, 2013).
Reardon, Marguerite; Tibken, Shara; "Apple takes NFC maintstream on iPhone 6; Apple Watch with Apple Pay", CNET, Sep. 9, 2014.
Rodrigues et al., Helena; "MobiPag: Integrated Mobile Payment, Ticketing and Couponing Solution Based on NFC", Sensors 2014, 14, 13389-13415;ISSN 124-8220, Jul. 24, 2014.
Sreekumar, Shiny; "Biometric Authentication in Mobile Payments", Master Thesis, Information Management, Faculty of Computer Sciences, Sep. 2010.
Tamas, Fabian; "NFC-enabled Automated Teller Machine", Obuda University, NIK. Nov. 28, 2014.
TapWise—Near Field Communication (NFC) Services and Cloud-Based Tag Management, Dec. 1, 2014.
VoxLoc—Mastercard announces high level of success with biometric system. Sep. 23, 2014.
White Paper—Beyond the Hype: Mobile Payments for Merchants, 2013.
White Paper—Cloud Based Ticketing: Next Generation Fare Collection, Mar. 23, 2014.
White Paper—Mobile Commerce in Retail: Loyalty and Couponing, Jan. 2014.
White Pater—The Role of the Trusted Service Manager in Mobile Commerce, Dec. 2013.
Wollenhaupt, Gary; "Five Ways Mobile Technology will Revolutionize ATMs", White Paper—ATM MarketPlace, 2013.
U.S. Appl. No. 14/970,102 Office Action dated May 1, 2017.
U.S. Appl. No. 15/967,068, John Cronin, Managing NFC Data, filed Apr. 30, 2018.
U.S. Appl. No. 14/970,304 Final Office Action dated Oct. 1, 2018.
U.S. Appl. No. 14/970,080 Final Office Action dated Sep. 21, 2018.
U.S. Appl. No. 15/967,068 Office Action dated Sep. 4, 2018.
U.S. Appl. No. 14/970,338 Office Action dated Jun. 28, 2018.
U.S. Appl. No. 14/970,125 Office Action dated Jun. 29, 2018.
U.S. Appl. No. 14/970,311 Office Action dated Apr. 4, 2018.
U.S. Appl. No. 14/970,319 Office Action dated Jun. 26, 2018.
U.S. Appl. No. 14/970,056 Office Action dated Apr. 5, 2018.
U.S. Appl. No. 14/970,091 Office Action dated Jun. 1, 2018.
U.S. Appl. No. 14/970,340 Office Action dated Apr. 5, 2018.
U.S. Appl. No. 14/970,139 Office Action dated May 31, 2018.
U.S. Appl. No. 14/970,319 Final Office Action dated Jan. 28, 2019.
U.S. Appl. No. 14/970,338 Final Office Action dated Jan. 25, 2019.
U.S. Appl. No. 14/970,125 Final Office Action dated Jan. 28, 2019.
U.S. Appl. No. 14/970,139 Final Office Action dated Jan. 18, 2019.
U.S. Appl. No. 16/503,358, John Cronin, Managing NFC Devices Based on Downloaded Data, filed Jul. 3, 2019.
U.S. Appl. No. 14/970,311 Office Action dated Oct. 2, 2019.
U.S. Appl. No. 14/970,311 Final Office Action dated Jun. 13, 2019.
U.S. Appl. No. 14/970,056 Final Office Action dated Nov. 2, 2018.
Reuter, Thad; "NFC 'Add-On' Links Smart Phones, Contactless Pay", Paris Start-up Technology Vendor, ATM & Debit News. (Years: 2009).
"The Mobile Payments and NFC Landscape: A U.S. Perspective", A Smart Card Alliance Payments Council White Paper, Publication No. PC-11002 (Year: Sep. 2011).
U.S. Appl. No. 16/503,358 Office Action dated Jan. 7, 2020.
U.S. Appl. No. 14/970,304 Office Action dated Jul. 12, 2019.
U.S. Appl. No. 14/970,319 Office Action dated Jul. 10, 2019.
U.S. Appl. No. 14/970,080 Office Action dated Aug. 15, 2019.
U.S. Appl. No. 16/378,262, John Cronin, Transaction Modification Based on Real-Time Offers, filed Apr. 8, 2019.
U.S. Appl. No. 14/970,304 Final Office Action dated Apr. 9, 2020.
U.S. Appl. No. 14/970,311 Final Office Action dated Mar. 26, 2020.
U.S. Appl. No. 14/970,319 Final Office Action dated Apr. 6, 2020.
U.S. Appl. No. 16/271,677 Final Office Action dated Oct. 1, 2020.
U.S. Appl. No. 16/271,677 Office Action dated Apr. 2, 2020.
U.S. Appl. No. 14/970,080 Final Office Action dated May 7, 2020.
U.S. Appl. No. 16/378,262 Office Action dated Sep. 18, 2020.

\* cited by examiner

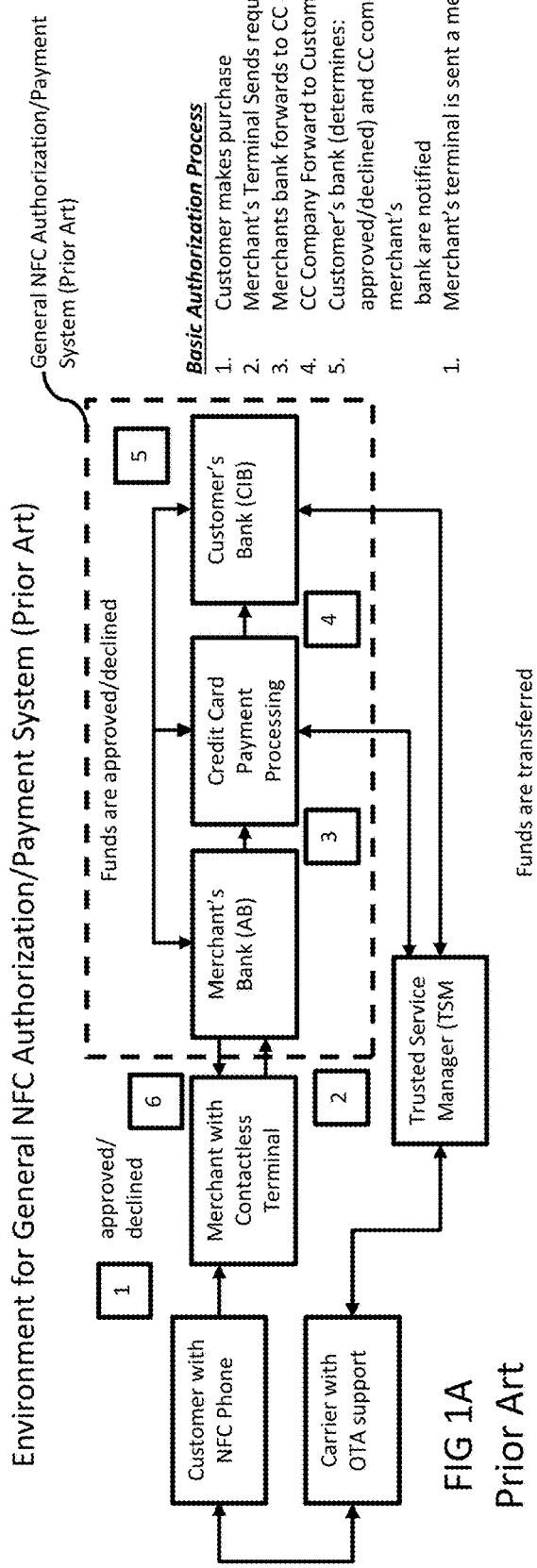
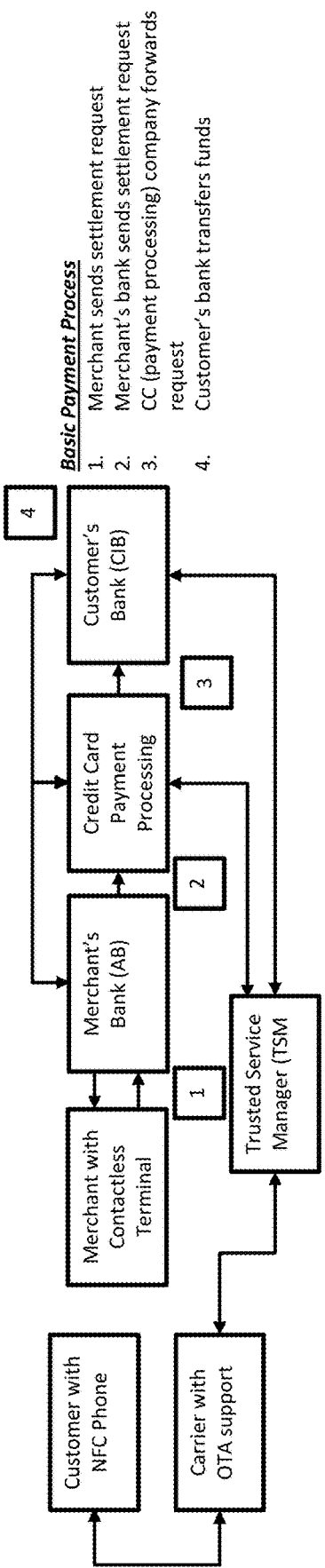
FIG 1A
Prior Art
FIG 1B
Prior Art

GUI (A) enables the user to trigger either Activate All Add-On Purchase Options or Select Add-On Purchase Options.

Where Select Add-On Purchase Options is chosen, GUI (B) is shown for the user to check Add-On Purchase Options.

(B)

(A)

The NCF Add-On Codes Database accesses the NFC Add-On Codes Database in the Cloud to identify the codes associated with the User Add-On Purchases, codes can be assigned universally or on a seller by seller basis.

NFC Add-On Codes Database for Add-On Purchase Options

- Code R = See Related Purchases
- Code A = See Accessory Purchases
- Code C = See Coupons
- Code B = See Rebates
- Code W = See Warranties
- Code H = See Recommended Purchases Based on User Purchase History
- Code I = See Recommended Purchases Based on Hot In Store Purchases by Follow Shoppers
- Code M = Repeat purchase for pick up or delivery in a set period (quarterly)

AUTOMATIC SHOPPING BASED ON HISTORICAL DATA

CROSS-REFERENCE TO RELATED APPLICATIONS

The present application claims the priority benefit of U.S. provisional application No. 62/093,284 filed Dec. 17, 2014 entitled "Automatic Shopping Based on Historical Data," the disclosure of which is hereby incorporated by reference.

BACKGROUND

Field of Invention

The present invention generally relates to near field communications (NFC). More specifically, the present invention relates to optimizing the value of in-store purchases at the point-of-sale by using near field communications to obtain data about add-on purchases prompted by real-time and historic data.

Description of the Related Art

Near field communication (NFC) is a form of contactless communication between devices (e.g. smartphones or tablets). Contactless communication allows a user to move (e.g. wave or pass) the device within a certain distance from other NFC-compatible devices to send information without the need to provide physical contact between the devices or to undergo multiple steps to set up a connection between the devices.

NFC maintains interoperability between different wireless communication methods and other NFC standards. Standards-setting organizations, such as the NFC Forum, may provide standards that manufacturers may use when designing NFC-compatible devices. These standards ensure that NFC is secure and remains easy-to-use with different versions of the technology.

The technology behind NFC allows a device (also referred to as a reader, interrogator or active device) to create a radio frequency (RF) current that is used to communicate with other NFC compatible devices or a small NFC tag holding information that might be of interest to the reader. Passive devices, such as the NFC tag, can be provided in posters and other forms of media or advertising. These passive devices store information and communicate with the reader, but do not actively read other devices.

Peer-to-peer communication between two active devices is also possible with NFC. This communication would allow both devices to send and receive information.

Real-time and historic data about consumer purchases are generally available for online purchases. Use of a variety of information can be helpful in providing assistance for the customer in making a purchase or informing the customer of other potential purchases. Such information includes real-time data about a current purchase, historic data about past purchases, related products, and popular products purchased by peers.

SUMMARY OF THE CLAIMED INVENTION

Embodiments of the present invention include systems and methods directed towards optimizing in-store purchases at a point-of-sale using near field communications (NFC) for a purchase transaction performed by a user on their NFC compatible device. In particular, the purchaser is capable of requesting data for making additional purchases and completing those additional purchases at the same time as the original NFC purchase transaction.

BRIEF DESCRIPTION OF THE DRAWINGS

FIG. 1A is a flowchart illustrating a prior art method for basic authorization based on near field communication (NFC).

FIG. 1B is a flowchart illustrating a prior art method for basic payment based on NFC.

FIG. 6 illustrates an exemplary NFC add-on code database that may be used in a system for automatic shopping based on historical data.

DETAILED DESCRIPTION

FIG. 1A is a flowchart illustrating a prior art method for basic authorization based on near field communication (NFC). FIG. 1B is a flowchart illustrating a prior art method for basic payment based on NFC.

With reference to the basic authorization process of FIG. 1A, a customer can initiate the basic authorization process by buying one or more items with an NFC-compatible device (e.g., smart phone). The customer NFC-compatible device communicates with a merchant point-of-sales (POS) terminal. This POS terminal can be a contactless terminal for NFC transactions.

Upon receiving a purchase request from the customer, the merchant terminal provides the request to the merchant bank. The merchant bank then forwards the request to the credit card payment processing. The credit card payment processing further forwards the request to the customer bank.

At the customer bank, a determination as to whether to approve or decline the request is made. This determination can be based on a variety of different parameters. The outcome of the determination (e.g., approved or declined) can be provided back to the credit card company and the merchant bank. The merchant terminal is afterwards informed by the merchant bank about the authorization status for the customers recent purchase.

The basic authorization process may further include the Trusted Service Manager (TSM) and carrier with OTA (over-the-air) programming. The TSM acts as a neutral broker that sets up secure connections between different elements. In this case, the TSM can find the encryption codes for communications between the credit card payment systems and the customer bank. Meanwhile, the carrier with OTA programming may provide various methods for distributing new software updates, configuration settings and even updating encryption keys for the system.

FIG. 1B outlines the process for basic payment using NFC, which may have similar elements (e.g., customer, merchant, credit card, TSM, carrier with OTA programming) and interaction as identified above for the basic authorization process of FIG. 1A. In particular, a merchant first sends settlement requests to the merchant bank. That request is forwarded to the credit card payment processing and to the customer bank. The customer bank then transfers the requested funds as necessary based on the request.

Figure 2:
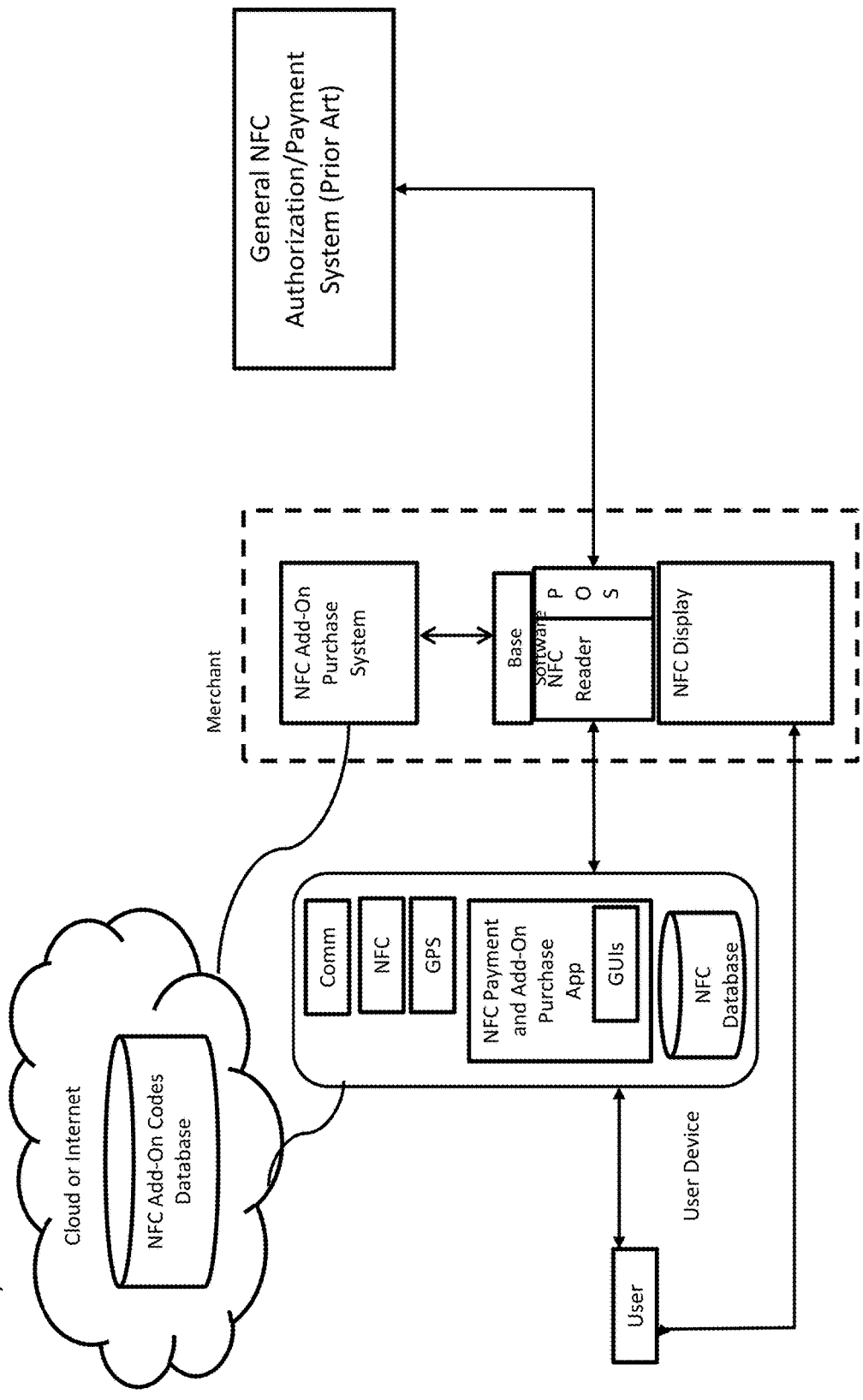
FIG. 2 illustrates a network environment in which an exemplary system for automatic shopping based on historical data may be implemented.

FIG. 2 illustrates a network environment in which an exemplary system for automatic shopping based on historical data may be implemented. The network environment may include a user device, a merchant system, NFC add-on codes database, and a general NFC authorization/payment system. A user and their user device may be at an NFC point-of-sale (POS) in a store corresponding to the merchant system.

The user device can be, for example, a mobile device. The user device has an NFC payment and add-on purchase application. The application itself may have a graphical user interface (GUI). The application may also include, as an application add-on, programming interface (API) that the user can use to add the user device when setting up NFC payments. The NFC payment and add-on purchase application may be one of many applications stored in the user device. The application may come with the user device or downloaded and saved to the user device by the user. Alternatively, the application may be an add-on application, which is initiated when the user interacts with the merchant system.

The GUI within the NFC payment and add-on purchase application allows the user to authorize payments for an NFC transaction. Additionally, the application may also allow the user to request data about additional purchases which the customer may be interested in (discussed later).

The user device may also include an NFC database. The database is used to support NFC operations and capabilities on the user device.

The user device can connect to the cloud/Internet, which allows the user device to connect to the NFC add-on codes database which may be stored in the cloud/Internet (discussed later). By accessing the NFC add-on codes database, the user device can download codes, which include universal codes for different types of additional purchases the customer may be interested in (e.g., coupons or warrantees) or codes that are created on a per-seller basis (e.g., related products). For example, when the user device is at a certain seller/store, the user device can prompt for seller-specific codes from the NFC add-on code database.

The network environment may further include the merchant system. The merchant system may include an NFC reader and POS. The merchant system may also include base software, an NFC display, and NFC add-on purchase system. The components in the merchant system allow additional purchase data to be displayed on the NFC display for the user to view. The additional purchase data to be displayed can be initiated by the merchant system when it receives a request for the additional purchase data from the customer user device.

The merchant system, through the POS and base software, interacts with the general NFC authorization payment system. The payment system is used to complete the payment for a transaction between the customer and the merchant.

When a purchase has been scanned at a POS by the user, the POS will then prompt the user to authorize the payment for the transaction. At this time, the user can request add-on/additional purchase information through their user device. The user device can transmit both the payment authorization to the merchant system, which is forwarded to the payment system, as well as the request for add-on or additional purchase information.

When the merchant system receives the request for add-on/additional purchase information, the merchant system initiates the NFC add-on purchase system to obtain the requested additional information. The information, once obtained, is then displayed on the NFC display of the merchant system. The user can interact with the NFC display to indicate additional purchases. If the user selects makes one or more additional purchases through the NFC display, the price of the additional purchases can be added to the pending transaction between the user and the merchant system. The merchant system can then request re-authorization from the user for a new total corresponding to the pending transaction with the additional purchases. Once authorized, the payment system can complete the payment authorization for the transaction. The data regarding this finalized transaction can be stored to be used later as historic data for future purchases by the user.

Figure 3B:
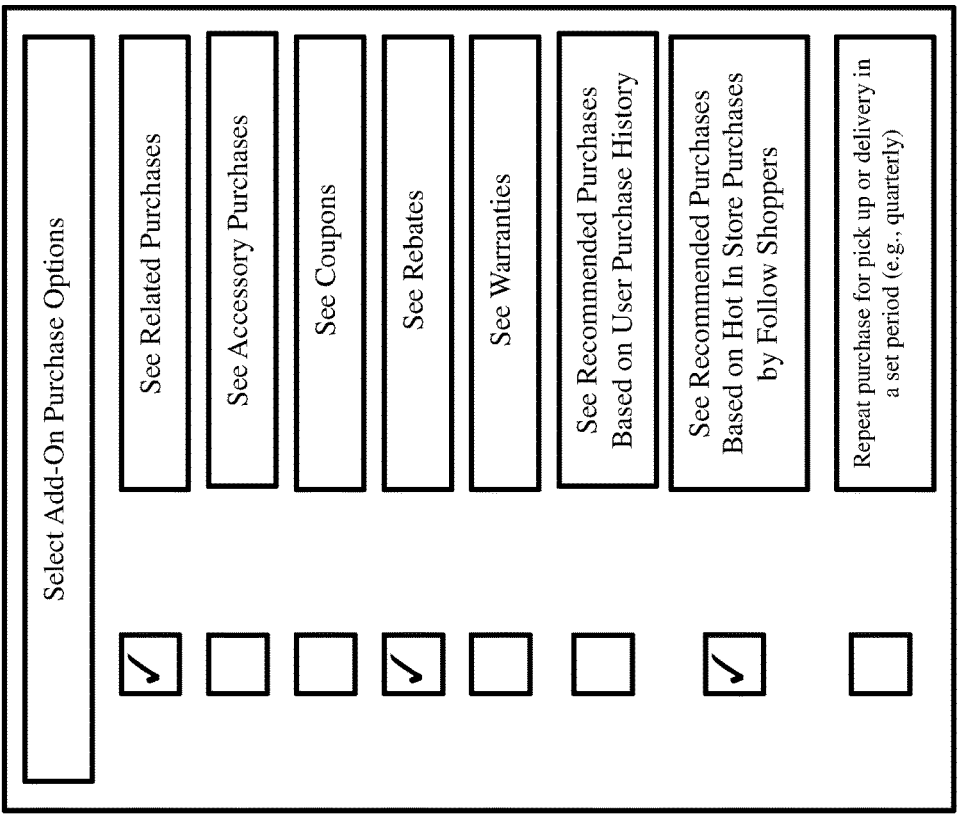
FIG. 3A and FIG. 3B illustrate exemplary NFC payment and add-on purchase application GUIs found on the user device that may be used in a system for automatic shopping based on historical data.
Figure 3A:
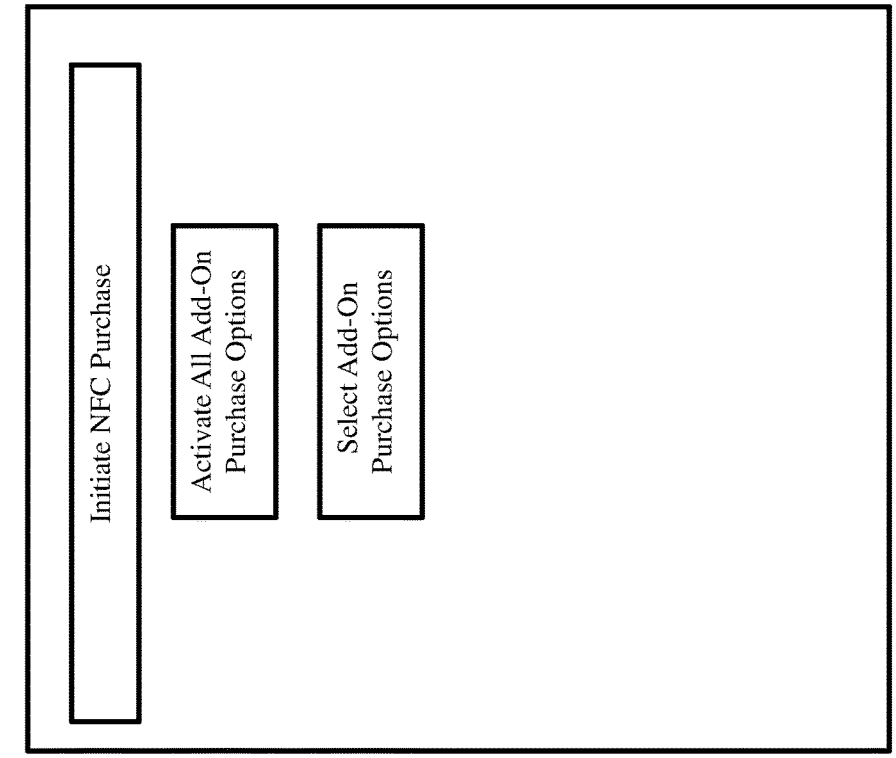

FIG. 3A and FIG. 3B illustrate exemplary NFC payment and add-on purchase application GUIs found on the user device that may be used in a system for automatic shopping based on historical data. The application may include a functionality of add-on purchase options, which can be activated for each individual purchase by the user.

FIG. 3A illustrates a GUI where the user can choose to initiate NFC purchases. Selection of this option can allow the user to authorize a pending NFC transaction. The user can also choose to activate all or a selective number of purchase options (as seen in FIG. 3B). If the activate all option is chosen, all the add-on purchase options (as seen in FIG. 3B) may be enabled.

FIG. 3B illustrates exemplary add-on purchase options. More or fewer options may be included, as well as other and different types of options than those illustrated in FIG. 3B. Such options are provided so that the user can customize and select what features or properties can be implemented in an NFC transaction.

The user can select from a number of different options (e.g., related purchases, accessory purchases, coupons, rebates, warranties, recommended purchases based on history). These options may control what type of additional purchase information can be displayed on the merchant NFC when the user makes a request for the additional purchase information.

Figure 4:
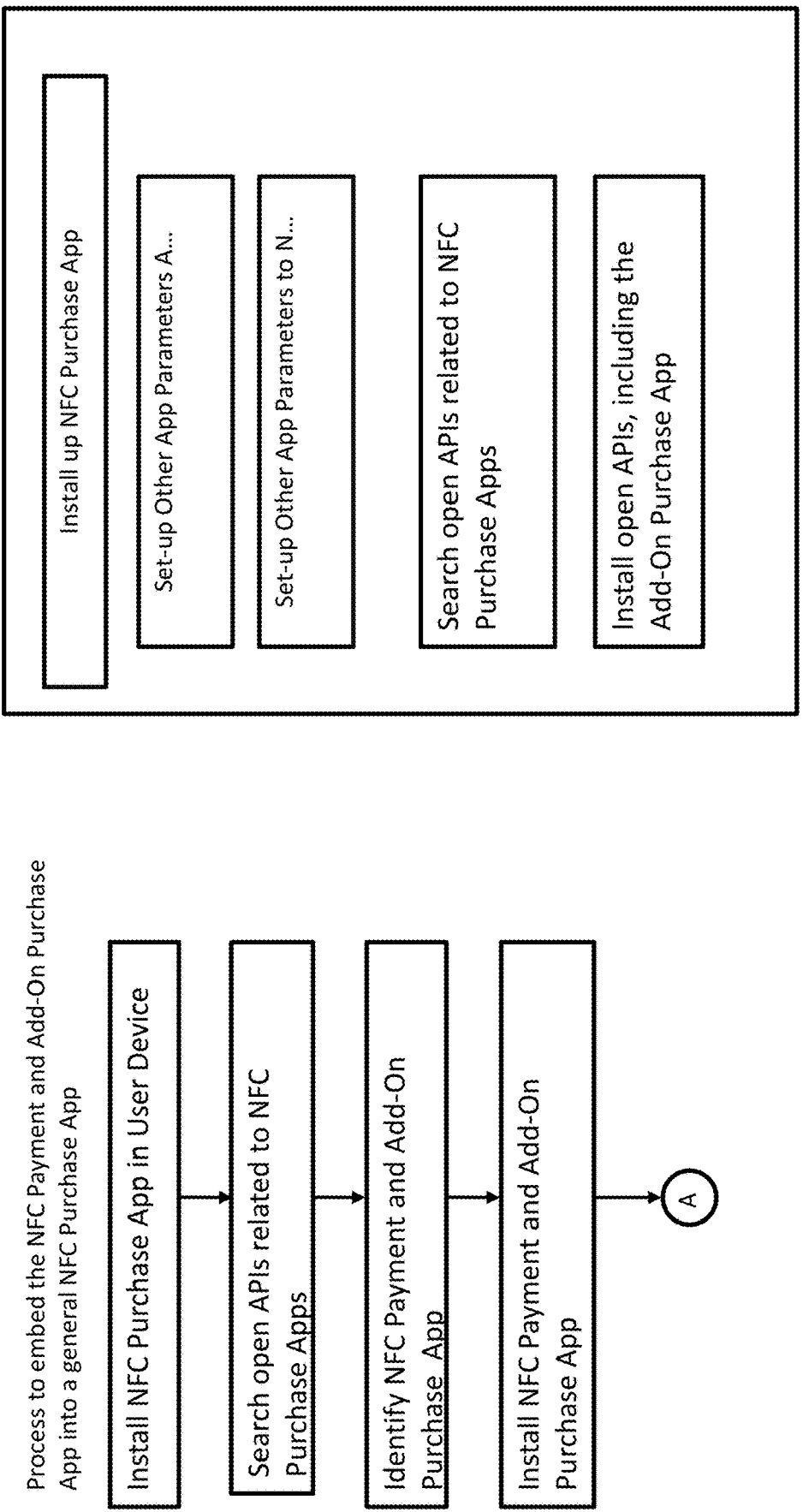
FIG. 4 illustrates an exemplary NFC payment and add-on purchase application at a point-of-sale that may be used in a system for automatic shopping based on historical data.

FIG. 4 illustrates an exemplary NFC payment and add-on purchase application at a POS that may be used in a system for automatic shopping based on historical data. Use of the exemplary NFC payment and add-on purchase application may be responsive to the user providing a request for additional purchase information at the POS in a store.

When a request for the additional information is requested, the user is then prompted to install the NFC payment and add-on purchase application onto the user device (if it is not already on the device previously). At this time, the user can also search for APIs or any other available add-on related to the NFC purchase application. The user can then select these add-ons and install them with the NFC purchase application onto the user device.

FIG. 4 further includes a GUI that can be used to execute a process described above for setting up the NFC purchase application at the POS. In particular, the GUI enables the user to set up application parameters (e.g., FIG. 3B) and search for add-ons for the NFC purchase application. Through the installation of the NFC purchase application and various add-ons (e.g., APIs), the user can use the application to request additional purchase information when conducting an NFC transaction in a store.

Figure 5:
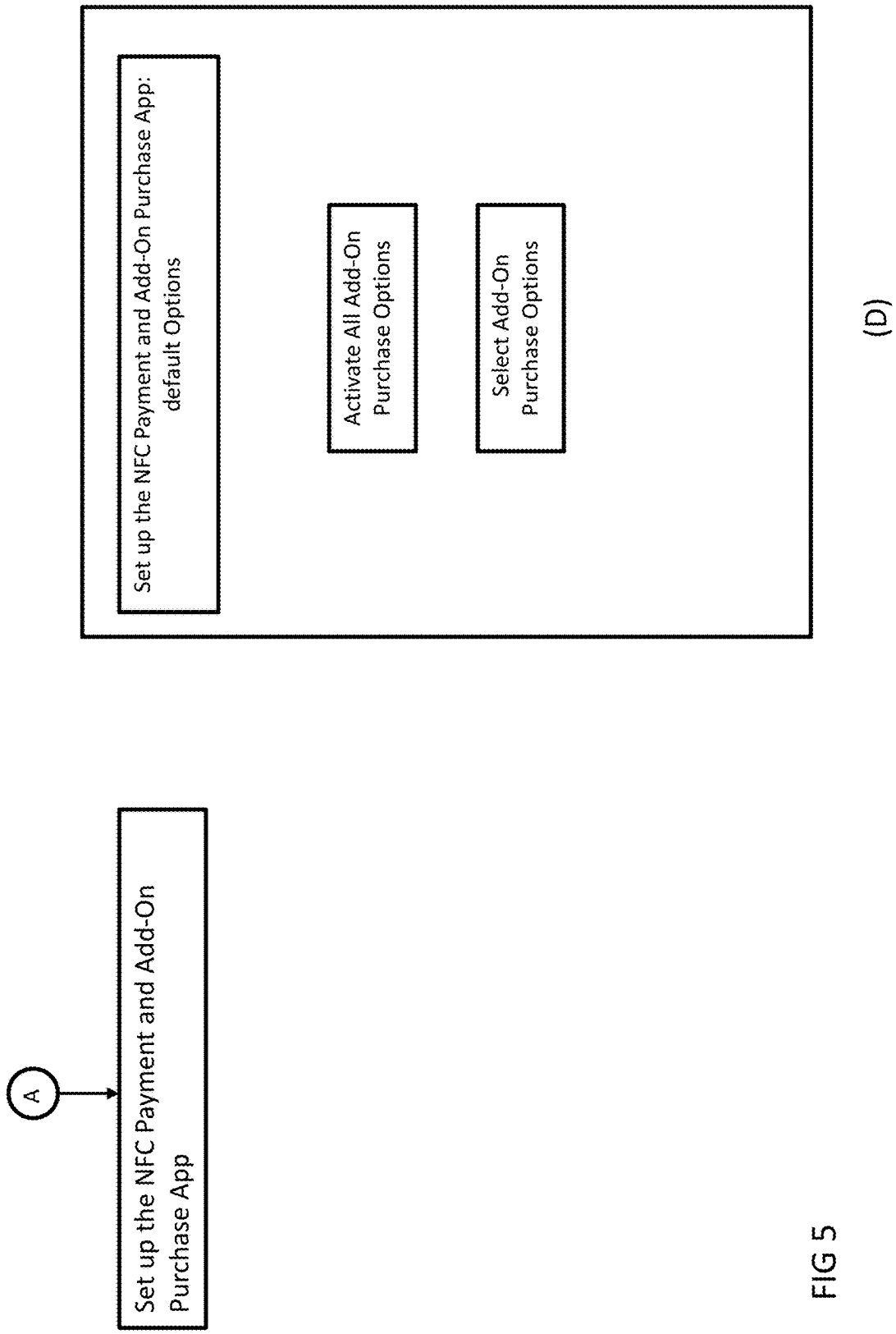
FIG. 5 illustrates an exemplary NFC payment and add-on purchase application GUI for the embodiment illustrated in FIG. 4.

FIG. 5 illustrates another exemplary NFC payment and add-on purchase application GUI for the embodiment illustrated in FIG. 4. In particular, the FIG. 5 is a continuation from FIG. 4 after the NFC payment and add-on purchase application has been set up on the user device. The GUI illustrated in FIG. 5 is similar to the GUI in FIG. 3A and similarly allows the user to activate all or select specific add-on purchase options. If the user decides to select only some of the add-on purchase options, a GUI similar to FIG. 3B can be provided where the user can select one or more options as desired. The default options may also enable the user to select one or more add-on purchase options to be used for this and other future NFC transactions.

FIG. 6 illustrates an exemplary NFC add-on code database that may be used in a system for automatic shopping based on historical data. The NFC add-on code database (as illustrated in FIG. 2) can be stored and accessible via the cloud/Internet. The NFC add-on code database can be accessed by user devices through the use of the NFC payments and add-on purchase application. The NFC add-on code database contains one or more add-on purchase options that correspond to the type of related purchases that a user may want to view for additional purchases. The add-on purchase options are stored in the database as codes. Exemplary codes can be seen in the figure. It should be noted that more or fewer codes can be provided in the database. Different types of codes can further be used as well.

The codes that are used for the add-on purchases can include codes that may be universally accepted, codes that may be assigned to a particular industry, or codes that may be specific to a particular seller. The database may also contain multiple sets of codes, where the sets may include the different types of codes (e.g., universal, assigned or specific).

The use of the codes found in the add-on database is designed to take up a small capacity of the communication to the NFC reader during an NFC transmission because of the nature of the limited bandwidth capacity in using NFC. If more than one add-on purchase option is selected, one or more codes from the add-on database can be combined to create a still limited data bandwidth indication to be included in the communications to the NFC reader. Even when there is more than one code to be transmitted to the NFC reader, the combination may be a small capacity of the overall communication, so that the codes for the add-on purchase options of the request can be communicated within the same NFC transmission as the payment authorization.

As indicated above, the use of add-on purchase information allows the user to view other additional purchase options related to one or more items in the pending transaction. The use of add-on purchase information can also benefits the merchant by providing more potential purchase options for the user to potentially increase the pending transaction or induce the user to make future transactions.

Figure 7:
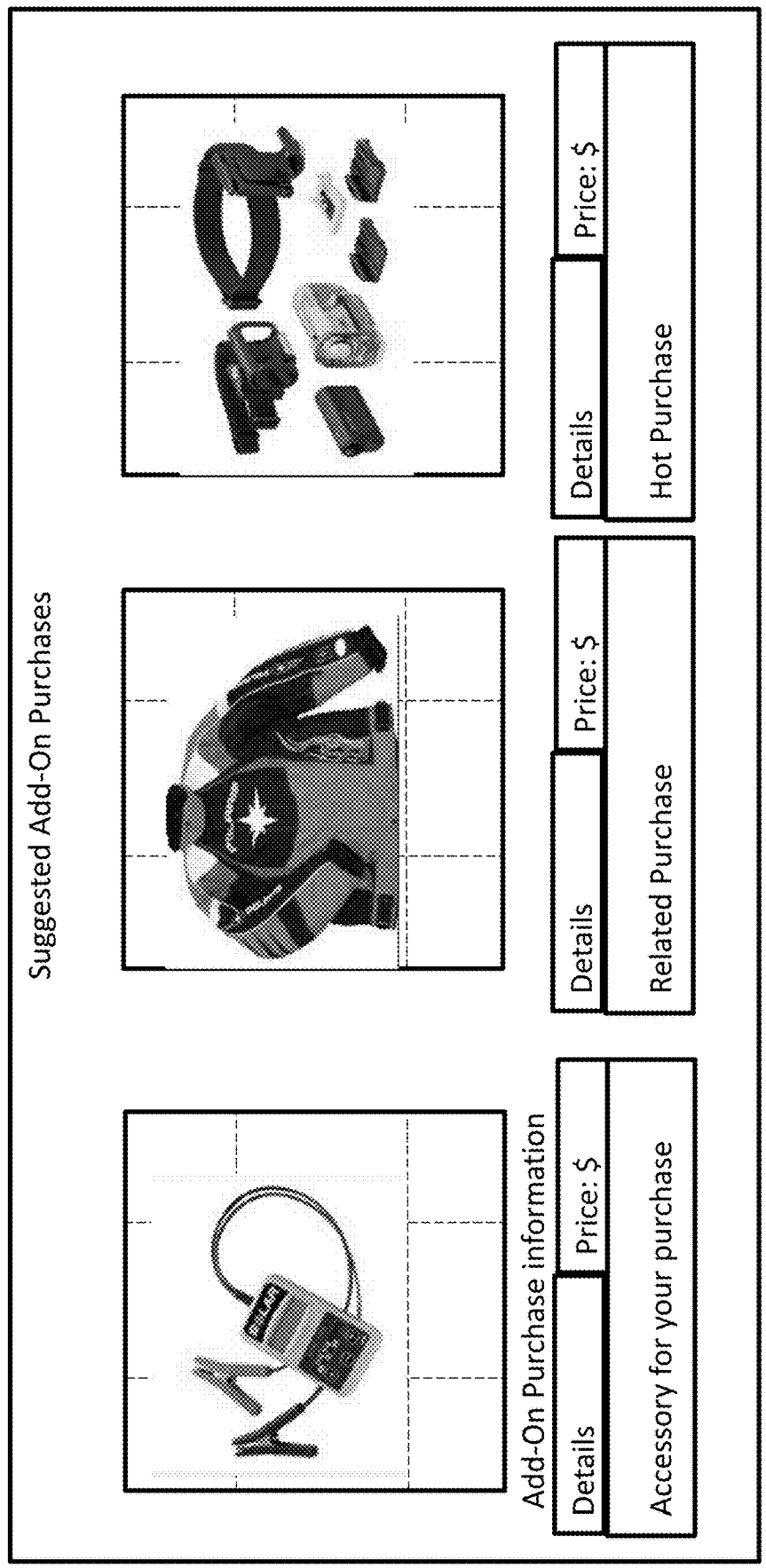
FIG. 7 illustrates exemplary NFC display found at the merchant point-of sale that may be used in a system for automatic shopping based on historical data.

FIG. 7 illustrates exemplary NFC display found at the merchant POS that may be used in a system for automatic shopping based on historical data. As indicated above, the NFC display facilitates the display of the additional purchase information which is the outcome of the user request for add-on purchase options data. The related products are displayed on the NFC display so that the user can view and make one or more selections if desired.

To help facilitate the decision of the user on making one or more selections for purchasing the related items, the NFC display may provide information about the one or more related products including a name and description of the related item, why the related item is being suggested, and the price of the related item, as well as one or more graphics corresponding to the related item. The information may be also included regarding the availability of the related item in-store. In particular, the availability may include whether the user could obtain the item in-store or if delivery of the item is provided in the future if the item is not currently available in-store.

After viewing the items on the NFC display, the user can interact with the NFC display to select one or more of the items to be purchased. Such user interactions may include using touchscreen components or a cursor to select or activate a selection related to information for the particular item. These additional items purchased can then be added to the same pending NFC transaction between the user and the merchant. Alternatively, it may be possible for the merchant to store the information about the additional purchases in order to initiate a secondary NFC transaction after this first transaction, which would include the additional related purchases to be authorized and finalized.

FIGS. 8-11 illustrate exemplary flowcharts illustrating exemplary methods for automatic shopping based on historical data. In particular, the user may indicate via a GUI on the user device an interest in receiving additional add-on purchase options data (e.g., indicate all add-on purchase options data). The information for the additional add-on purchase options are transmitted within a limited bandwidth associated with NFC. The user device may also have the NFC payment and add-on purchase application installed to facilitate the processes described herein prior to initiating the NFC transaction with the merchant.

Figure 8:
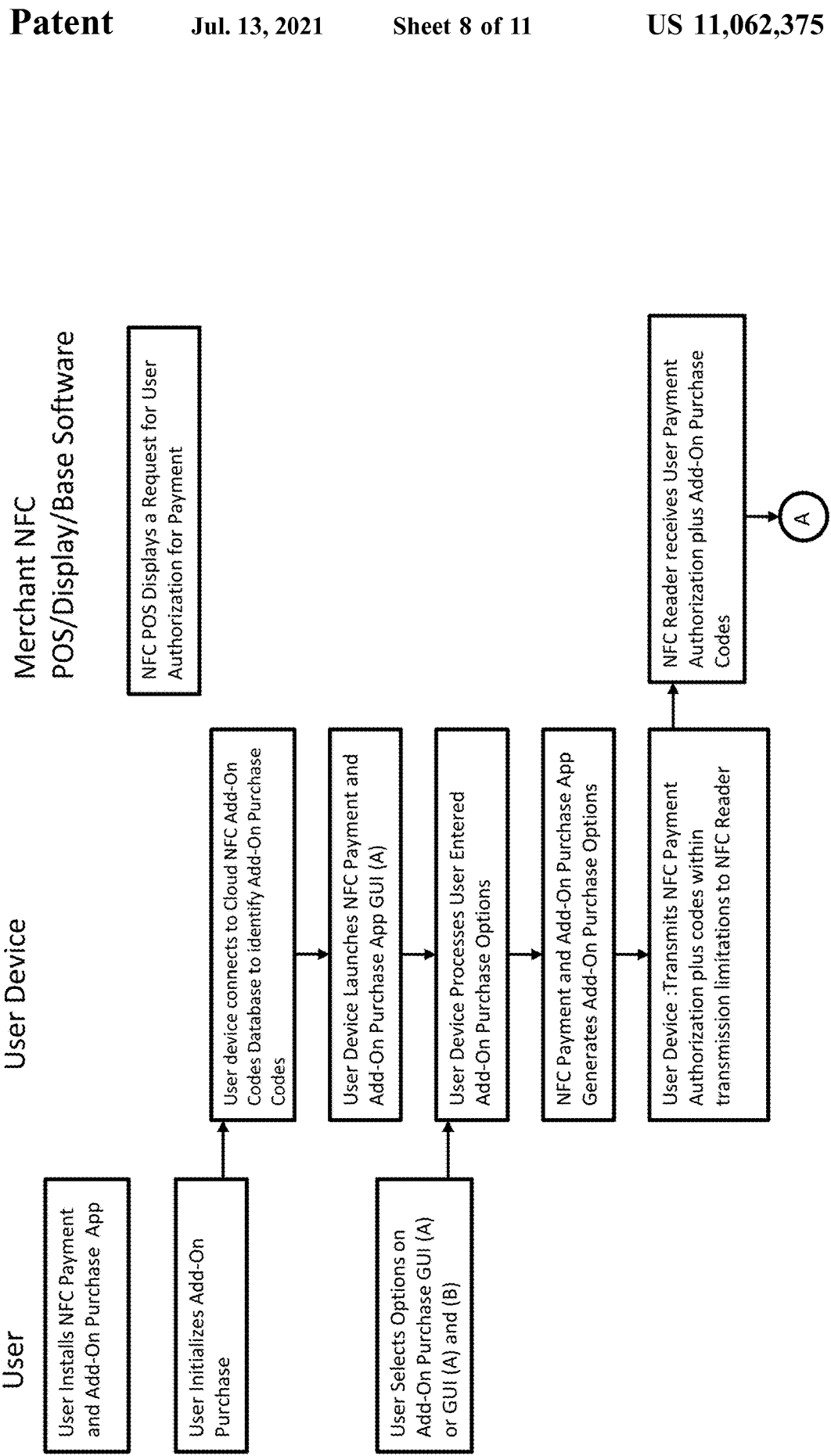
FIGS. 8-11 illustrate exemplary flowcharts illustrating exemplary methods for automatic shopping based on historical data.

In FIG. 8, the initiation of the process may correspond to a user beginning an NFC transaction for a purchase of an item. While at the merchant POS, the user may indicate a request for additional add-on purchase information from their user device. The user initiates the add-on purchase options from the NFC payment add-on purchase application. This enables the user device to connect to the NFC add-on code database stored in the cloud/Internet. Corresponding codes are provided based on the add-on purchase options selected by the user. The particular codes provided can be selected based on the user selection from GUI found on the user device (e.g., FIGS. 3A and 3B).

With the codes, the NFC add-on purchase system generates add-on purchase options and the user device transmits the NFC payment authorization for the initial NFC transaction along with the codes corresponding to add-on purchase requests to the merchant. The total communication transmission between the user device and the NFC reader may need to be within the transmission limitations for NFC.

The merchant receives the request from the user through the NFC reader, processes the request in order to gather additional information about the add-on purchases, displays the additional information on the display, and allows the user to interact with the display and add more items to the purchase as desired. The original total for the initial NFC transaction may be modified based on the selected additional products the user may wish to buy from the add-on purchase information. After the user has completed viewing and adding any additional purchases, the merchant requests the user to further authorize payment for the modified pending NFC transaction (e.g., for initial item and any additional items).

The user device may correspond to an entity or a component used by an entity. The merchant system—inclusive of POS, NFC display, and base software—may be viewed as another entity or component used by an entity. These entities may include, for example, in-store employees or a general NFC authorization payment system.

Figure 9:
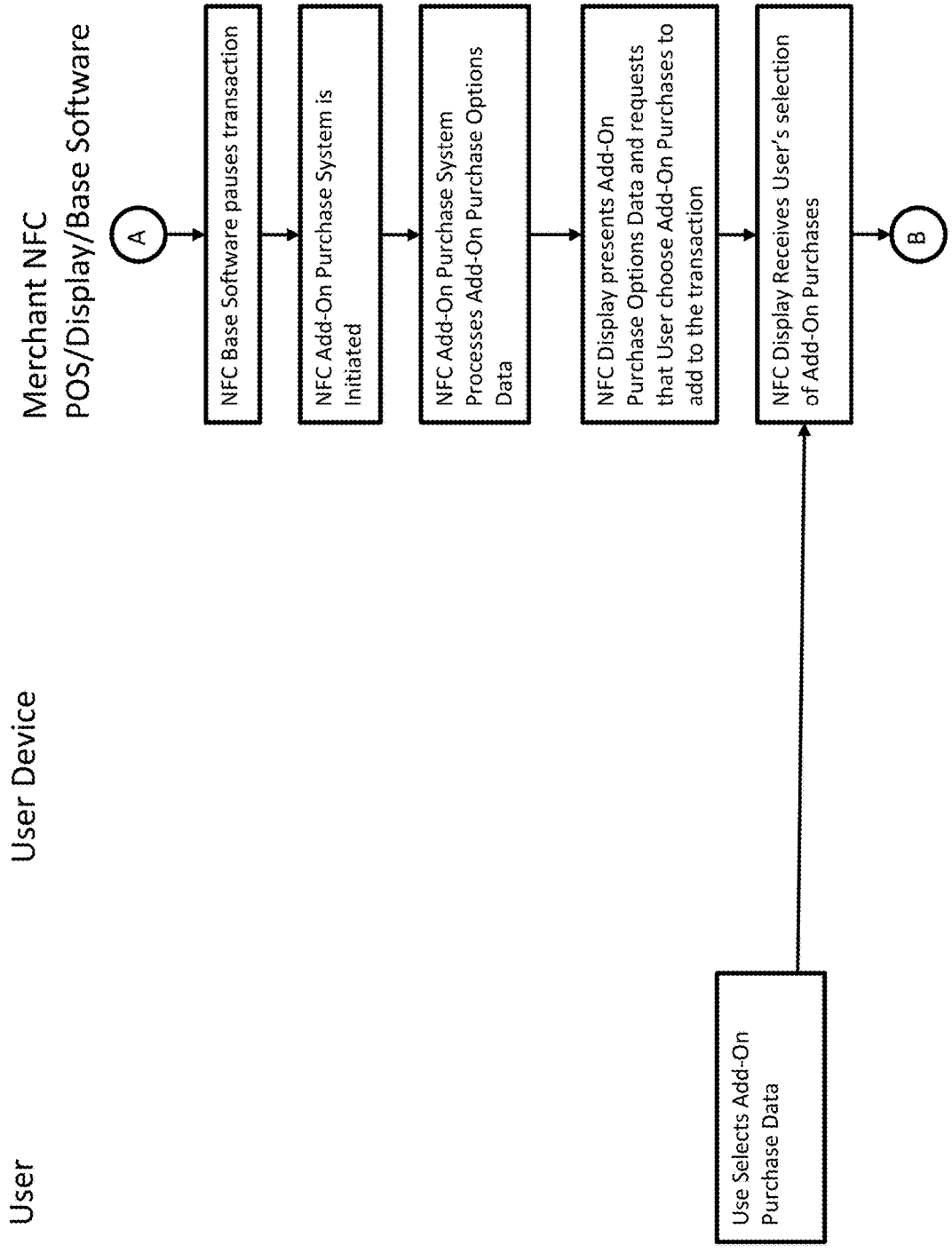

FIG. 9 is a continuation of the flowchart of FIG. 8, illustrating what occurs after the merchant has received payment authorization and the add-on purchase codes from the user device.

The purchase system may be initiated, and the add-on purchase options data obtained from the user device in code form may be added. Afterwards, a search may be conducted for the requested add-on purchase information. For example, if the user had said they wanted to see additional coupons or rebates, that information is gathered as to what is available from the add-on purchase system.

In another embodiment, if there is an interest from the user in seeing popular items the store, data may be obtained to determine what is popular in real-time. For example, if during the day additional or new items are added to store inventory, these same items can also be viewed as being related purchases or popular items at the time the user transaction occurs. In other words, these additional items can also be updated on a real-time basis.

After the base software obtains the requested add-on purchase information, the additional products are displayed on the NFC display on the merchant system for the user to view. From the NFC display, the user can select one or more of the add-on purchases to add to the pending transaction as desired.

As described above, the benefit to the user in having the add-on purchases displayed on the NFC display upon request is to provide a more enriched shopping experience for the user. In particular, the experience provides the user with one or more potential additional items of which the user might not otherwise have been aware. Merchants may also receive an increase in the amount of the transaction, as well as purchases overall.

Figure 10:
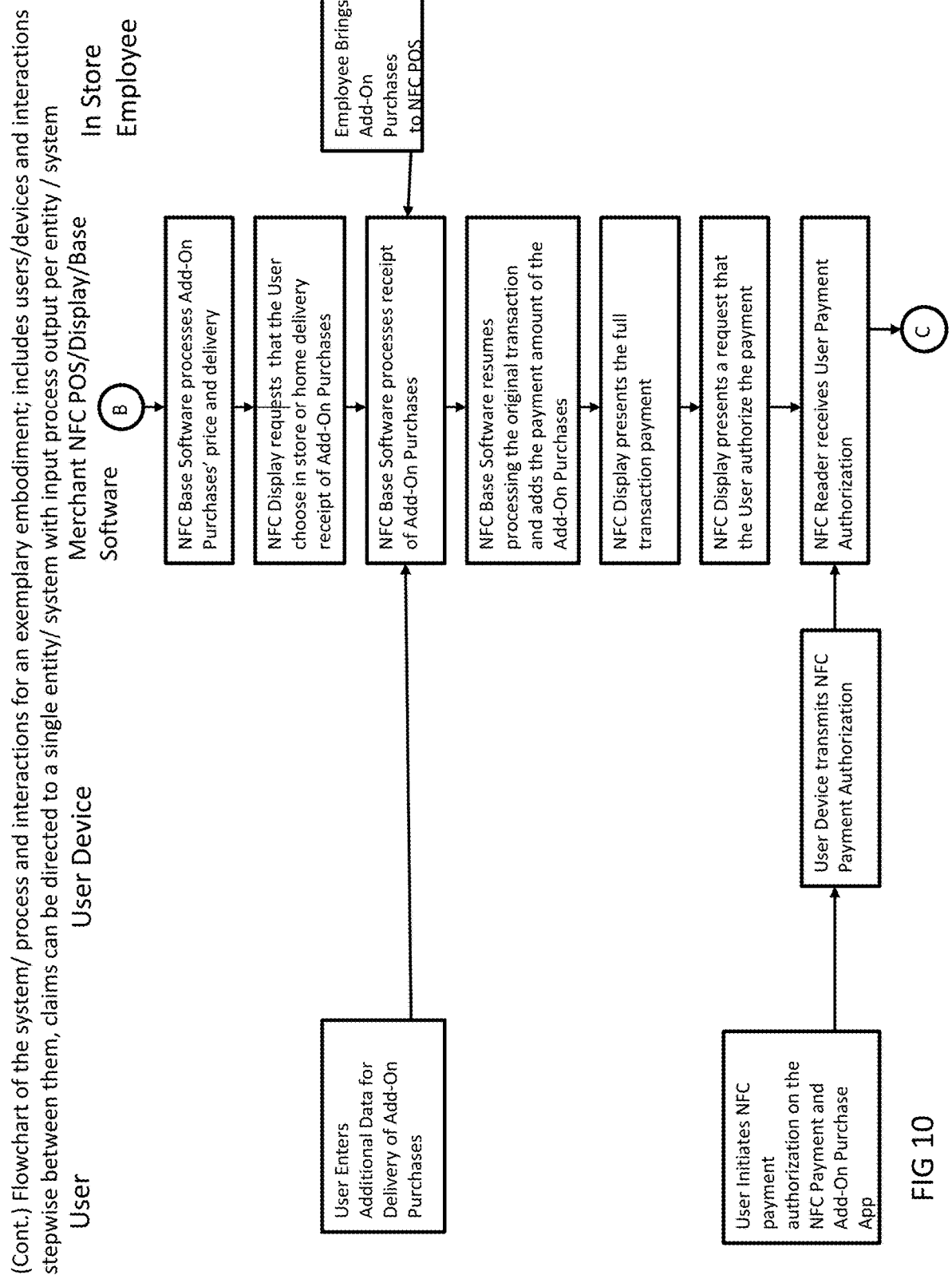

FIG. 10 continues from FIG. 9, where the illustrated steps may be performed at the merchant NFC POS display and base software. The add-on purchases price and delivery options may be processed. The NFC display provides a request that the user choose a delivery option (e.g., in-store pick-up or home delivery upon receipt of add-on purchases). The user can also enter additional data for the delivery of the additional purchases. In situations where in-store pick up is chosen, an employee working in the store may retrieve the item for the user and bring it to the POS where the user is conducting the transaction.

Processing of the original transaction may resume. In particular, the original transaction is either replaced with a new transaction (including the initial purchase and the new add-on purchases) or modified with the add-on purchases information. The NFC display presents the pending full transaction payment including the total for the items in the initial transaction, as well as one or more selected add-on purchases.

Afterwards, the NFC display may then present a request that the user needs to authorize the payment for the pending transaction. Then, the NFC receives the user payment authorization from the user. This corresponds with the user initiating an NFC payment authorization on the NFC payment and add-on purchase application on their user device and transmits the NFC payment authorization to the merchant.

Figure 11:
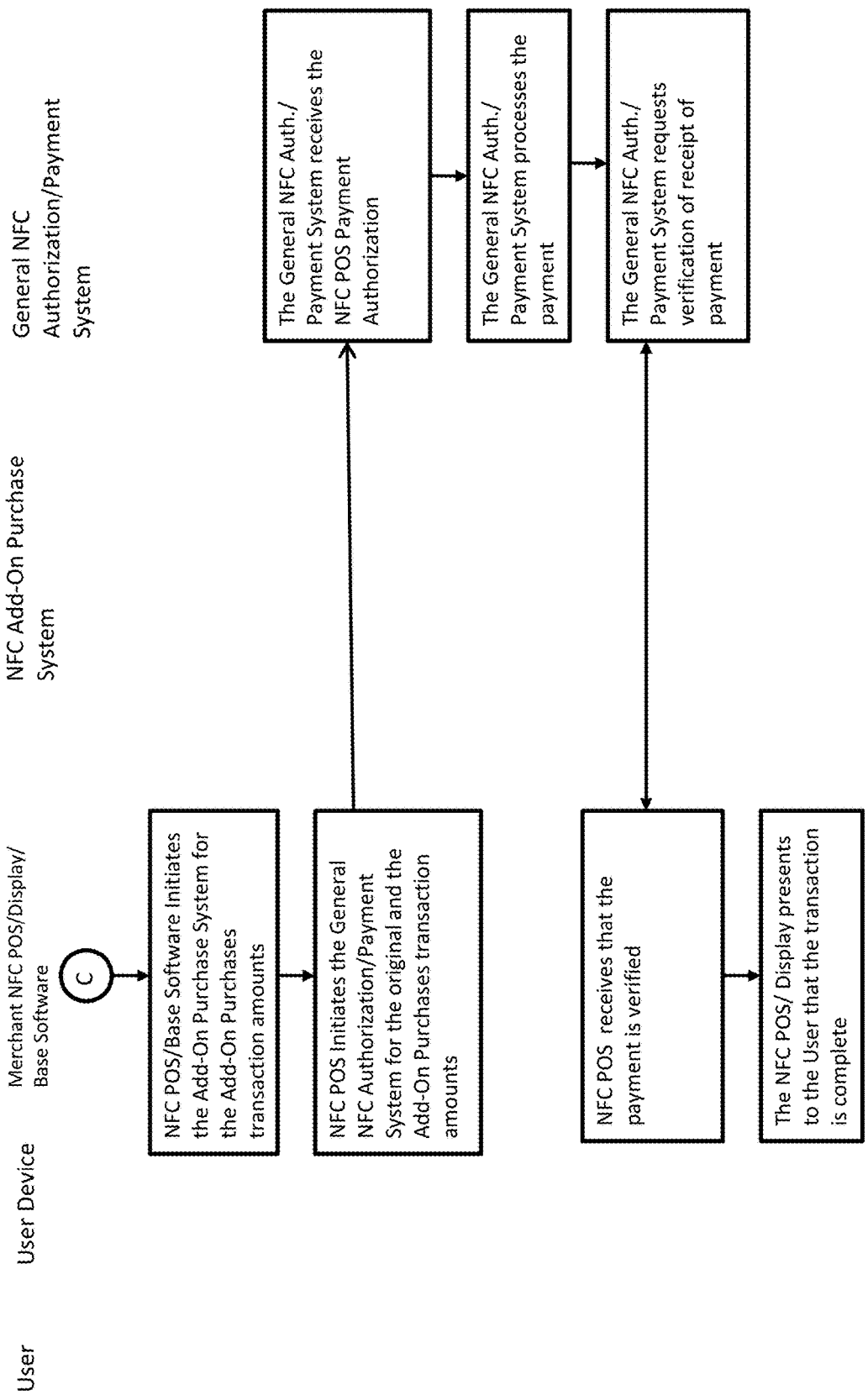

The method then continues in FIG. 11, which corresponds to the merchant modifying the pending transaction to include the additional purchases with the items in the original transaction. As illustrated, the method may continue with the POS and the base software initiating the add-on purchase system for the add-on purchases. The NFC POS initiates the general NFC authorization payment system for the original and add any additional add-on purchases to the transaction amount. The authorization payment system receives the payment authorization from the user and begins to process the payment. The authorization payment system further requests verification of receipt of the payment back to the merchant. The merchant then displays on the POS display that the transaction is complete for the user to view.

It should be noted that software may be stored in any various forms of non-transitory forms of memory as are known in the art. Software stored in memory may be executed by a processor or processing devices at a computing device, which may be mobile in nature such as a mobile phone or tablet device. The computing device executing the instructions from memory may have one or more communications interfaces that allow for connection to wired or wireless networks as well as interaction with wired or wireless devices, including NFC devices.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for using near field communication (NFC) to provide add-on purchases, the method comprising:

receiving data associated with an NFC transaction initiated between a mobile device and a merchant device via an NFC authorization system, wherein the data associated with the initiated NFC transaction includes an authorization to use specified NFC-based payment information to pay for an original purchase price of one or more items and a request from the mobile device for additional purchase data related to at least one of the items in the initiated NFC transaction between the mobile device and the merchant device;

retrieving the additional purchase data regarding one or more add-on items from an add-on database stored in cloud storage based on the request from the mobile device included in the data associated with initiated NFC transaction, the add-on items selected based on at least the items in the purchase, the additional purchase data including an NFC add-on code in the add-on database corresponding to a type of purchase associated with the add-on items;

displaying the additional purchase data in a menu listing the one or more add-on items on a display of the merchant device involved in the initiated NFC transaction;

automatically modifying the data associated with the initiated NFC transaction by adding an additional purchase price to the original purchase price in response to a user selection received from the menu of the display of the merchant device specifying at least one of the add-on items to obtain an updated total price; and transmitting the modified data associated with the initiated NFC transaction to the NFC authorization system, wherein the NFC-based payment information specified in the initiated NFC transaction is used to pay for the updated total price based on the modified data.

2. The method of claim 1, further comprising receiving the user selection specifying the at least one add-on item from the displayed menu.

3. The method of claim 1, further comprising automatically requesting reauthorization to use the NFC-based payment information specified in the initiated NFC transaction to pay for the updated total price.

4. The method of claim 1, wherein the add-on items are further selected based on at least one of historical data regarding previous transactions, current purchasing trends, and detected purchase patterns.

5. The method of claim 4, further comprising maintaining the historical data in the add-on database, and updating the add-on database based on the modified data associated with the initiated NFC transaction.

6. The method of claim 1, wherein the mobile device downloads a plurality of codes from the add-on database, each code associated with a different type of add-on item.

7. The method of claim 6, wherein the downloaded codes include at least one code specific to a merchant associated with the merchant device.

8. The method of claim 6, further comprising receiving one of the codes from the mobile device as part of the initiated NFC transaction.

9. The method of claim 1, further comprising pausing the initiated NFC transaction based on the request, wherein the paused NFC transaction remains pending while the data associated with the initiated NFC transaction is modified.

10. The method of claim 1, wherein the request from the mobile device further specifies a type of add-on item, and wherein the additional purchase data is specific to the type of add-on item specified by the request.

11. The method of claim 1, wherein the request from the mobile device is designated by a code, wherein an amount of data associated with the code is limited by an NFC transmission capacity between the mobile device and the merchant device.

12. The method of claim 11, wherein the limited amount of data associated with the code allows for the code to be communicated with a same NFC transmission as the authorization to use the specified NFC-based payment information.

13. A system for using near field communication (NFC) to provide add-on purchases, the system comprising:
an NFC interface that receives data associated with an NFC transaction initiated between a mobile device and a merchant device via an NFC authorization system, wherein the data associated with the initiated NFC transaction includes authorization to use specified NFC-based payment information to pay for an original purchase price of one or more items and a request from the mobile device for additional purchase data related to at least one of the items in the initiated NFC transaction between the mobile device and the merchant device;
an add-on database stored in cloud storage, wherein the add-on database stores the additional purchase data regarding one or more add-on items based on the request from the mobile device included in the data associated with initiated NFC transaction, wherein data regarding selected add-on items is retrieved from the add-on database based on at least the items in the purchase, the additional purchase data including an NFC add-on code in the add-on database corresponding to a type of purchase associated with the add-on items;
a display screen at the initiated NFC transaction that displays the additional purchase data in a menu listing the one or more add-on items;
a processor that executes instructions stored in memory, wherein execution of the instructions by the processor automatically modifies the data associated with the initiated NFC transaction by adding an additional purchase price to the original purchase price in response to a user selection received from the menu of the display of the merchant device specifying at least one of the add-on items to obtain an updated total price; and
a communication interface that transmits the modified data associated with the initiated NFC transaction to the NFC authorization system, wherein the NFC-based payment information specified in the initiated NFC transaction is used to pay for the updated total price based on the modified data.

14. The system of claim 13, further comprising a user interface that receives the user selection specifying the at least one add-on item from the displayed menu.

15. The system of claim 13, wherein the processor further automatically requests reauthorization to use the NFC-based payment information specified in the initiated NFC transaction to pay for the updated total price.

16. The system of claim 13, wherein the processor executes further instructions to select the add-on items further based on at least one of historical data regarding previous transactions, current purchasing trends, and detected purchase patterns.

17. The system of claim 16, wherein the add-on database further maintains the historical data, and wherein the add-on database is updated based on the modified data associated with the initiated NFC transaction.

18. The system of claim 13, wherein the mobile device downloads a plurality of codes from the add-on database, each code associated with a different type of add-on item.

19. The system of claim 18, wherein the downloaded codes include at least one code specific to a merchant associated with the merchant device.

20. The system of claim 18, wherein the NFC interface further receives one of the codes from the mobile device as part of the initiated NFC transaction.

21. A non-transitory computer-readable storage medium, having embodied thereon a program executable by a processor to perform a method for using near field communication (NFC) to provide add-on purchases, the method comprising:
receiving the data associated with an NFC transaction initiated between a mobile device and a merchant device via an NFC authorization system, wherein the data associated with the initiated NFC transaction includes an authorization to use specified NFC-based payment information to pay for an original purchase price of one or more items and a request from the mobile device for additional purchase data related to at least one of the items in the initiated NFC transaction between the mobile device and the merchant device;
retrieving the additional purchase data regarding one or more add-on items from an add-on database stored in cloud storage based on the request from the mobile device included in the data associated with initiated NFC transaction, the add-on items selected based on at least the items in the purchase, the additional purchase data including an NFC add-on code in the add-on database corresponding to a type of purchase associated with the add-on items;

displaying the additional purchase data in a menu listing the one or more add-on items on a display of the merchant device involved in the initiated NFC transaction;

automatically modifying the data associated with the initiated NFC transaction by adding an additional purchase price to the original purchase price in response to a user selection received from the menu of the display of the merchant device specifying at least one of the add-on items to obtain an updated total price; and transmitting the modified data associated with the initiated NFC transaction to the NFC authorization system, wherein the NFC-based payment information specified in the initiated NFC transaction is used to pay for the updated total price based on the modified data.

* * * * *